United States Patent
Düppre

(10) Patent No.: US 8,138,431 B2
(45) Date of Patent: Mar. 20, 2012

(54) WEIGHING CELL HAVING A PLUG-TYPE CONNECTION FOR RECEIVING A CONVEYOR SYSTEM

(75) Inventor: Theo Düppre, Kaiserlautern (DE)

(73) Assignee: Wipotec Wiege-und Positioniersysteme GmbH, Kaiserslautern (DE)

(*) Notice: Subject to any disclaimer, the term of this patent is extended or adjusted under 35 U.S.C. 154(b) by 327 days.

(21) Appl. No.: 12/094,393

(22) PCT Filed: Nov. 20, 2006

(86) PCT No.: PCT/DE2006/002038
§ 371 (c)(1),
(2), (4) Date: Sep. 5, 2008

(87) PCT Pub. No.: WO2007/057002
PCT Pub. Date: May 24, 2007

(65) Prior Publication Data
US 2008/0314650 A1    Dec. 25, 2008

(30) Foreign Application Priority Data
Nov. 21, 2005    (DE) .................. 10 2005 055 753

(51) Int. Cl.
G01G 11/00    (2006.01)
G01G 21/28    (2006.01)

(52) U.S. Cl. .................. 177/126; 177/145; 177/238

(58) Field of Classification Search .................. 177/126, 177/145, 238, 239–244
See application file for complete search history.

(56) References Cited

U.S. PATENT DOCUMENTS

| | | | |
|---|---|---|---|
| 3,773,124 A | 11/1973 | Bullivant | |
| 4,619,337 A * | 10/1986 | Behrend et al. | 177/210 R |
| 4,802,540 A * | 2/1989 | Grabovac et al. | 177/211 |
| 4,986,376 A * | 1/1991 | Cone | 177/128 |
| 5,033,562 A * | 7/1991 | Cone | 177/128 |
| 5,111,896 A * | 5/1992 | Porcari et al. | 177/16 |
| 5,294,756 A * | 3/1994 | Lauber et al. | 177/119 |
| 5,304,745 A | 4/1994 | Rusk et al. | |
| 5,367,128 A | 11/1994 | Tsukasa et al. | |
| 5,379,923 A * | 1/1995 | Sagastegui et al. | 222/181.2 |
| 6,509,533 B1* | 1/2003 | Murata et al. | 177/126 |

(Continued)

FOREIGN PATENT DOCUMENTS

DE    21 13 880 A1    9/1972

(Continued)

OTHER PUBLICATIONS

German Examination Report from DE 10 2005 055 753.8 dated Jul. 21, 2006, pp. 1-4.

(Continued)

Primary Examiner — Randy W Gibson
(74) Attorney, Agent, or Firm — The Culbertson Group, P.C.

(57) ABSTRACT

A weighing cell includes a load receptor having a plug connector mounted thereon. The plug connector is adapted to receive a complementary plug connector of a conveying system so as to connect the conveying system to the load receptor either mechanically or electrically, or both. The load receptor-mounted plug connector may be adapted to receive the complementary plug connector in only one orientation to ensure proper electrical connections where such connections are made through the plug connector. The load receptor-mounted plug connector also include a centering arrangement for facilitating the proper connection with the complementary plug connector.

14 Claims, 2 Drawing Sheets

U.S. PATENT DOCUMENTS

| | | | |
|---|---|---|---|
| 6,787,713 B2 * | 9/2004 | Kuechenmeister et al. | 177/132 |
| 6,830,476 B2 * | 12/2004 | Gesuita et al. | 439/498 |
| 6,958,452 B2 * | 10/2005 | Takahashi | 177/145 |
| 7,060,914 B2 * | 6/2006 | Suzuki | 177/238 |
| 7,208,688 B2 * | 4/2007 | Jauert et al. | 177/238 |
| 7,750,253 B2 * | 7/2010 | Wineland | 177/16 |
| 7,935,900 B2 * | 5/2011 | Schilling et al. | 177/126 |
| 2009/0008158 A1 | 1/2009 | Duppre | |
| 2009/0090566 A1 * | 4/2009 | Ruth et al. | 177/244 |

FOREIGN PATENT DOCUMENTS

| | | |
|---|---|---|
| DE | 33 18 406 C2 | 10/1986 |
| EP | 1 101 715 A1 | 5/2001 |
| EP | 0 722 082 B1 | 10/2001 |
| EP | 1 400 789 A2 | 3/2004 |
| EP | 1 101 715 B1 | 9/2004 |
| JP | 05-248928 A | 9/1993 |
| JP | 10-122944 A | 5/1998 |

OTHER PUBLICATIONS

JPO, Office Action issued on Mar. 23, 2011 in corresponding Japanese Patent Application No. 2008-541585 (13 pages).

* cited by examiner

WEIGHING CELL HAVING A PLUG-TYPE CONNECTION FOR RECEIVING A CONVEYOR SYSTEM

TECHNICAL FIELD OF THE INVENTION

The invention pertains to a weighing cell that is adapted to weigh goods as they are transported by a conveyer system. In particular, the invention pertains to a connection between a load receptor of the weighting cell and the conveyor system.

BACKGROUND OF THE INVENTION

In metrology, it is known to determine the weight of moving goods. The scales used for this purpose can be easily incorporated into the manufacturing process.

The movement of the goods is realized with conveyor systems, the weight of which is usually also supported by the weighing cell. The conveyor system comprises at least one drive that transports the goods to be moved in the conveying direction. The drive or the motor is connected to a power supply. Other connections for sensors or signal transmissions of any type are frequently also provided.

In this state of the art, it is disadvantageous that the electrical connection of the conveyor system may be complicated, possibly comprising several cables and also negatively influencing the weighing result when one end of the cable is connected to the conveyor system that is weighed together with the goods while the other end is connected to a stationary power supply.

The invention therefore aims to develop a weighing cell for a conveyor system that eliminates the aforementioned disadvantages.

SUMMARY OF THE INVENTION

According to the present invention, a conveyor system is mechanically and/or electrically connected to the weighing cell by means of a plug connection arranged on the load receptor of the weighing cell. Since the part of the plug connection associated with the weighing cell is arranged in the load receptor, the required connection is realized with this plug connection only. The electrical connection of the conveyor system, in particular, is therefore exclusively realized with the plug connection arranged in the load receptor such that other connections in the form of externally arranged cables are not required. The plug connection consisting of a first part arranged on the weighing cell and a complementary second part arranged on the conveyor system ensures that the conveyor system can be easily and quickly connected to and disconnected from the weighing cell. The additional clamping or unscrewing of cables or other holding elements is not required such that the replacement or cleaning process is advantageously simplified.

According to another advantageous embodiment of the invention, the conveyor system can be completely connected and disconnected mechanically and/or electrically with the aid of the plug connection by simply placing the conveyor system on the load receptor or removing the conveyor system from the load receptor, respectively. This means that the mechanical, and in particular, the electrical connection according to the invention is produced by placing the conveyor system on the load receptor such that no other connecting processes are required. This significantly accelerates assembly. In addition, a mix-up of electrical connections, a polarity reversal or the twisting of the plug connection is advantageously prevented, as described below.

According to another advantageous embodiment of the invention, all electrical connections required for the operation of the conveyor system are produced with the aid of the plug connection by placing the conveyor system on the load receptor. This means that the plug connection represents the only electrical coupling point for realizing the electric power supply of the conveyor system, as well as its reception or transmission of control signals. This simplifies the design and connection of the conveyor system, in particular because no cables other than the plug connection are required. In one particularly simple embodiment, the conveyor system features a pedestal that faces the weighing cell, wherein said pedestal is situated on the load receptor of the weighing cell and transmits the weight into the weighing cell. The inventive plug connection may be realized on the side of this pedestal that faces the weighing cell, so that the scale with the conveyor system and the weighing cell becomes assembled and ready for operation by simply mating this part of the connection with the complementary part of the weighing cell.

According to one particularly advantageous embodiment of the weighing cell, the plug connection is realized such that it is protected against twisting or polarity reversal. This can be realized by providing mechanical auxiliary elements that make it possible to mate the individual parts of the plug connection only if they are correctly aligned. Such auxiliary means can also be used for preventing an incorrectly twisted or misaligned mating of the individual parts of the plug connection by providing correspondingly restricted guides. This improves the safety and also simplifies the mating process.

According to another advantageous embodiment of the invention, the plug connection is realized in an explosion-proof fashion in order to fulfill corresponding requirements. To this end, the plug connection may be suitably encapsulated or comparably realized in order to reliably prevent the ignition of explosive mixtures.

In addition, the plug connection may also feature a suitable IP-protection. This is intended to protect particularly sensitive or hazardous components of the plug connection from external influences, particularly fouling, moisture, etc.

The plug connection may also be metallically encapsulated in order to improve the electromagnetic compatibility. This largely precludes any effects of high-frequency radiation into or out of the connection, and adjacent electronic components are correspondingly protected.

It has proved particularly advantageous to realize a weighing cell with a protective device on the plug connection that protects against accidental touching when the individual parts of the connection are separated. This protective device may consist, in particular, of a preferably spring-loaded automatically swings a cover sideways hinge mechanism that when the conveyor system is placed on the load receptor in order to expose the contacts (particularly the electrical contacts) of the respective mating parts of the connection. Conversely, the mechanism should automatically place the cover over the respective contacts when the conveyor system is removed in order to best protect the contacts from accidental touching or fouling, etc.

According to another advantageous embodiment of the invention, the weighing cell features a detachable quick-action clamping device. This quick-action clamping device is intended to secure the conveyor system relative to the weighing cell when it is placed thereon and connected thereto. Since the quick-action clamping device can also be disengaged, the reliable mechanical and electrical connection produced between the weighing cell and the conveyor system can be easily separated, and the quick-action clamping device can be just as easily disengaged from the weighing cell. This simplifies the assembly or replacement of the weighing cell or the conveyor system.

It has proved particularly advantageous to realize the quick-action clamping device such that it can be actuated without tools. In this case, the desired stable connection can be easily produced in a manual fashion without requiring a special tool. This also significantly simplifies the assembly and disassembly.

These and other advantages and features of the invention will be apparent from the following description of illustrative embodiments, considered along with the accompanying drawings.

DESCRIPTION OF ILLUSTRATIVE EMBODIMENTS

Figure 1:
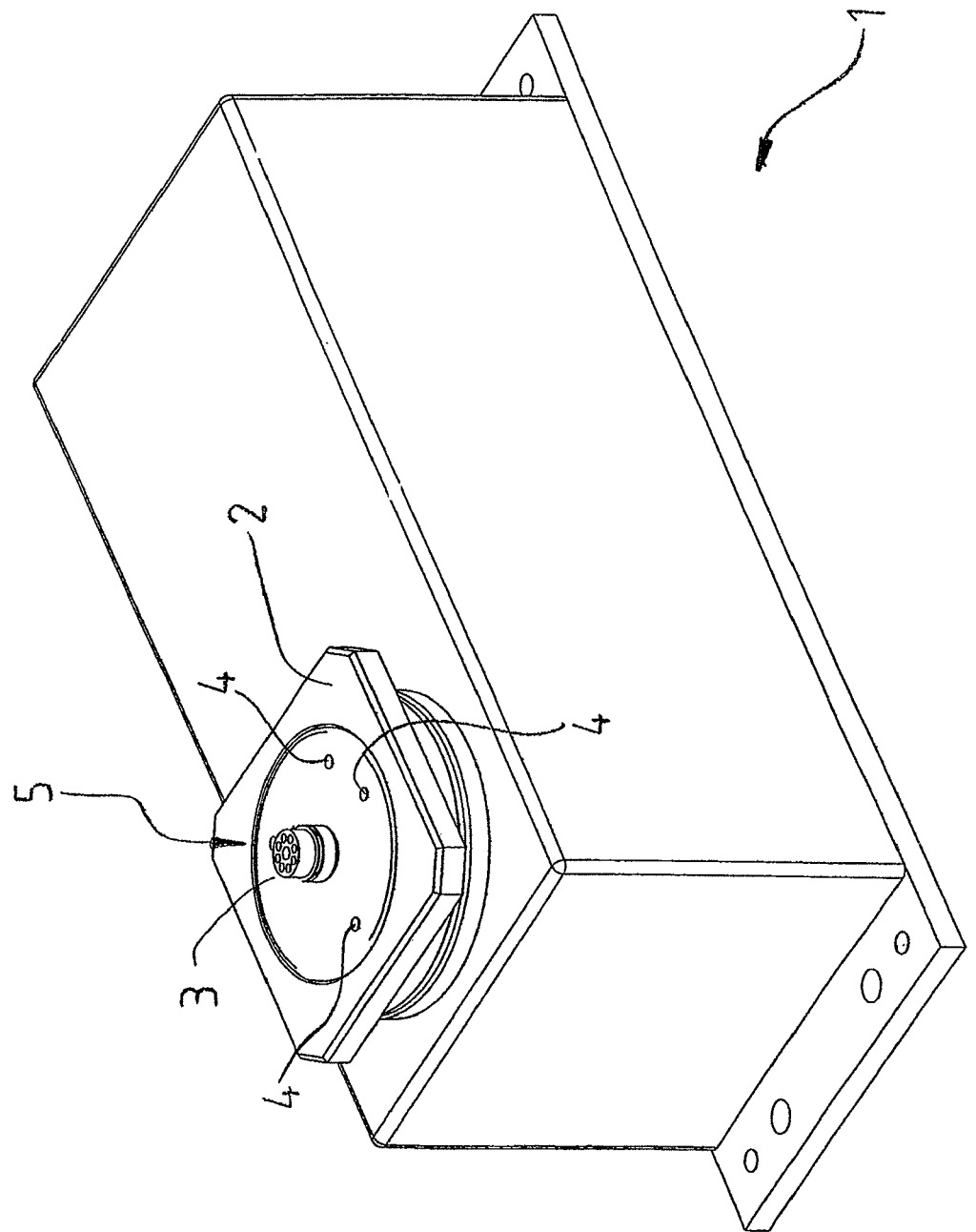
FIG. 1 comprises an oblique view of a weighing cell embodying one form of the present invention.
Figure 2:
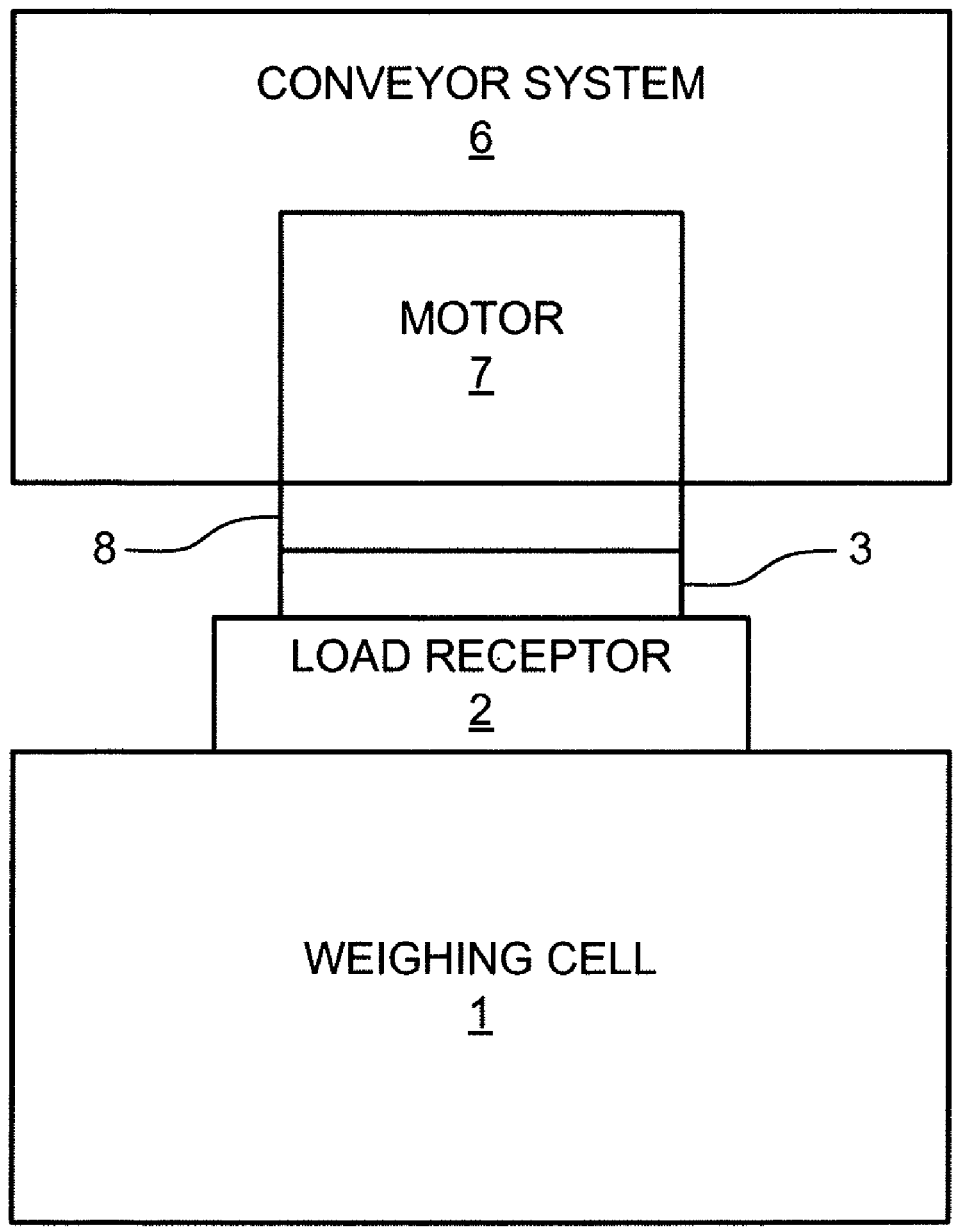
FIG. 2 is a diagrammatic representation of a weighing cell according to the present invention connected to a conveyor system.

The weighing cell 1 shown in FIG. 1 features a load receptor 2 that can be subjected to a weight to be measured. The weight is transmitted into the load receptor 2 by a conveyor system, wherein the conveyor system needs to be placed on the load receptor 2. The conveyor system is shown at reference numeral 6 in FIG. 2 along with a motor 7 included in the conveyor system.

The load receptor features one part 3 of a plug connection for producing the mechanical and electrical connection of the weighing cell with conveyor system 6 to be placed on the load receptor 2. This conveyor system 6 features the other, second part 8 of the plug connection that is realized in complementary fashion to the first part. The second part 8 of the plug connection is shown only in FIG. 2.

The plug connection 3 features stops for aligning the second part 8 of the plug connection. Also provided are centering means in the form of bores 4 that cooperate with suitable centering pins of the second part 8 of the connection, and thus make it possible to realize a precise mechanical alignment of the two parts to be mated.

The connection furthermore features an arrangement 5 of electric contacts that also cooperate with complementary contacts on the other part 8 of the connection in order thus to produce all electrical connections or signaling links with the conveyor system 6.

A quick-action clamping device for detachably securing the conveyor system 6 on the weighing cell 1 is not illustrated in the figure.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is;

1. An apparatus for determining the weight of goods transported by a conveyor system, the apparatus including:
   (a) a weighing cell;
   (b) a load receptor operable to receive a weight to be measured by the weighing cell; and
   (c) a first part of a plug connection mounted on the load receptor, the first part of the plug connection being operable to make a mechanical connection and an electrical connection with the conveyor system via a complementary second part of the plug connection which is connected to the conveyor system, the conveyor system including a motor and being operative to transport goods in a conveying direction, wherein the electrical connection comprises a complete electrical connection between the conveyor system and the weighing cell, and wherein removing the conveyor system from the load receptor completely disconnects the conveyor system from the weighing cell.

2. The apparatus of claim 1 wherein the first plug of the plug connection is configured such that the conveyor system is completely connected mechanically to the weighing cell by placing the conveyor system on the load receptor.

3. The apparatus of claim 1 wherein all electrical connections required for the operation of the conveyor system are provided through the first part of the plug connection in cooperation with the second part of the plug connection when the mechanical connection is made with the conveyor system.

4. The apparatus of claim 1 wherein the first part of the plug connection is configured to connect to the second part of the plug connection in only a single orientation.

5. The apparatus of claim 1 further including a centering structure configured to align the first part of the plug connection with the second part of the plug connection in making the mechanical connection.

6. The apparatus of claim 1 wherein the first part of the plug connection includes a metallic encapsulation operable to decrease electromagnetic interference in the first part of the plug connection.

7. The apparatus of claim 1 wherein the plug connection is realized as explosion-proof or IP-protected.

8. An apparatus for determining the weight of goods transported by a conveyor system, the apparatus including:
   (a) a weighing cell;
   (b) a load receptor operable to receive a weight to be measured by the weighing cell; and
   (c) a first part of a plug connection mounted on the load receptor, the first part of the plug connection being operable to connect in a connected position with a complementary second part of the plug connection on the conveyor system to make an electrical connection with the conveyor system via the complementary second part of the plug connection, the conveyor system including a motor and being operative to transport goods in a conveying direction.

9. The apparatus of claim 8 wherein the first part of the plug connection is configured such that the conveyor system is (i) completely connected electrically to the weighing cell when the conveyor system is placed on the load receptor with the first part of the plug connection in the connected position, or is (ii) completely disconnected electrically from the weighing cell by removing the first part of the plug connection from the connected position.

10. The apparatus of claim 8 wherein all electrical connections required for the operation of the conveyor system are provided through the first part of the plug connection when the first part of the plug connection is in the connected position.

11. The apparatus of claim 8 wherein the first part of the plug connection is configured to connect to the second part of the plug connection in only a single orientation so as to protect against polarity reversal in electrical contacts in the plug connection.

12. The apparatus of claim 8 further including a centering structure configured to align the first part of the plug connection with the second part of the plug connection in placing the first part of the plug connection in the connected position.

13. The apparatus of claim 8 wherein the first part of the plug connection includes a metallic encapsulation operable to decrease electromagnetic interference in the first part of the plug connection.

14. The apparatus of claim 8 wherein the plug connection is realized as explosion-proof or IP-protected.

* * * * *